(12) United States Patent
Tanaka et al.

(10) Patent No.: US 6,645,649 B2
(45) Date of Patent: Nov. 11, 2003

(54) SURFACE-COATED SINTERED BODY OF SILICON NITRIDE

(75) Inventors: Koichi Tanaka, Kokubu (JP); Takero Fukudome, Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/004,059

(22) Filed: Oct. 31, 2001

(65) Prior Publication Data

US 2002/0098391 A1 Jul. 25, 2002

(30) Foreign Application Priority Data

Oct. 31, 2000 (JP) ........................................ 2000-332659

(51) Int. Cl.$^7$ ................................................. B32B 9/00
(52) U.S. Cl. ........................ 428/697; 501/97.2; 428/701
(58) Field of Search ............................ 428/307.3, 312.4, 428/312.6, 315.9, 318.4, 319.1, 325, 446, 697, 698, 699; 501/53, 88, 92, 133, 154, 97.2

(56) References Cited

U.S. PATENT DOCUMENTS 5,200,374 A * 4/1993 Yamada et al. ............ 501/98.2
5,246,894 A * 9/1993 Okuda et al. ................. 501/88

FOREIGN PATENT DOCUMENTS

| JP | 201768 | * 10/1993 | ........... C04B/35/58 |
| JP | 07-172958 | 7/1995 | |
| JP | 07-172958 | * 11/1995 | ........... C04B/41/87 |
| JP | 08-034685 | * 6/1996 | ........... C04B/41/87 |
| JP | 2001-130983 | 5/2001 | |

* cited by examiner

Primary Examiner—Deborah Jones
Assistant Examiner—Arden Sperty
(74) Attorney, Agent, or Firm—Hogan & Hartson

(57) ABSTRACT

A surface-coated sintered body of silicon nitride wherein a coating layer on the surface comprises a crystalline phase of $RE_2Si_2O_7$ and/or $RE_2SiO_5$ (RE=rare earth element), the crystalline phase having an average crystalline particle diameter of not smaller than 0.1 μm, and the excess amount of $SiO_2$ contained in the coating layer being not larger than 10 mole %. The coating layer formed on the surfaces of the sintered body exhibits excellent adhering force even in a high-temperature zone of around 1500° C. and features a long life.

10 Claims, No Drawings

SURFACE-COATED SINTERED BODY OF SILICON NITRIDE

BACKGROUND OF THE INVENTION

1. Field of the Invention

The present invention relates to a surface-coated sintered body of silicon nitride having excellent strength at room temperature through up to high temperatures, excellent toughness against breakage and excellent resistance against oxidation. More specifically, the invention relates to a surface-coated sintered body of silicon nitride that can be suitably used as parts of gas turbine engines, such as turbine rotor, turbine blade, nozzle, combustor, scroll, nozzle support, seal ring, spring ring, diffuser, duct and shroud.

2. Description of the Prior Art

Owing it its excellent strength, hardness and thermal and chemical stability, the sintered body of silicon nitride has heretofore been used as engineering ceramics and, particularly, as a structural material for heat engines. The sintered body of silicon nitride has generally been prepared by adding a sintering assistant such as $Y_2O_3$, $Al_2O_3$ or MgO to a powder of silicon nitride and firing the mixture. Use of the above sintering assistant helps accomplish such properties as a high density and a high strength. Though the sintered body of silicon nitride is used, for example, as parts of the engines, it is desired to further improve the strength and resistance against the oxidation of the sintered body of silicon nitride at high temperatures since the parts of the engines have been used in ever high temperature conditions.

To meet such a demand, efforts have been made to improve the sintering assistant, grain boundary phases, sintering conditions, and protection film formed on the surfaces of the sintered body.

Japanese Unexamined Patent Publication (Kokai) No. 183676/1997 teaches an art for covering the surfaces of a sintered body comprising chiefly silicon nitride or SIALON with a glass layer comprising chiefly $SiO_2$ in order to improve mechanical strength and resistance against oxidation at high temperatures.

In recent years, further, attempts have been made to coat the surfaces of a sintered body of silicon nitride with SiC, $Al_2O_3$ or $ZrO_2$ having good resistance against oxidation as a protection film by such a method as CVD or melt-injection in order to improve resistance against oxidation, resistance against erosion and resistance against corrosion.

However, the surface-coating materials such as $SiO_2$, SiC, $Al_2O_3$ and $ZrO_2$ have such problems as lack of resistance against corrosion or heat, developing cracks during the use due to a difference in the coefficient of thermal expansion from that of the sintered body of silicon nitride which is a substrate, resulting in the occurrence of peeling.

By forming the glass layer on the surface as taught in the above Japanese Unexamined Patent Publication (Kokai) No. 183676/1997, properties can be improved under static conditions. When exposed to a gas of a high temperature, a high pressure and a high velocity in a practical engine, however, the glass layer is quickly worn out due to the vaporization of $SiO_2$ arousing a problem in that the glass layer has a short life and fails to serve as a protection film.

The present applicant has previously proposed an art for preventing the coated layer from peeling or cracking by coating the surfaces of the sintered body of silicon nitride with a layer that contains a crystalline phase such as of a disilicate or a monosilicate having excellent properties against oxidation. Though the sintered body of silicon nitride having a coating layer formed on the surface thereof exhibits favorable properties concerning the initial resistance against corrosion, however, there still exists a problem in that the resistance against the corrosion gradually decreases.

SUMMARY OF THE INVENTION

The present inventors have conducted keen study concerning the corrosion resistance that deteriorates with the passage of time and have discovered the following new fact.

That is, when there exists an excess of $SiO_2$ on the grain boundaries of crystalline phases of a disilicate or a monosilicate forming a coating layer, oxygen diffuses and infiltrates through $SiO_2$ into the sintered body of silicon nitride which is a substrate and, besides, the $SiO_2$ phase on the grain boundaries is gasified upon reacting with water. As a result, the coating layer becomes porous permitting the substrate to be easily corroded. In forming the coating layer, further, even if the ratio of $SiO_2$ and an oxide of a rare earth element is so set that a predetermined crystalline phase will precipitate, the composition of the coating layer changes through the high-temperature firing, precipitating, for example, trace amounts of a nitrogen-containing crystalline phase such as YAM or apatite in addition to the predetermined crystalline phase. With the nitrogen-containing crystalline phase being oxidized, cracks develop in the coating layer and, as a result, the corrosion resistance gradually decreases.

It is therefore an object of the present invention to provide a surface-coated sintered body of silicon nitride having a coating layer which remains highly strongly adhered to the substrate (sintered body of silicon nitride) even when used in a high-temperature region of from about 800 to about 1600° C. and permits the corrosion resistance to change little.

According to the present invention, there is provided a surface-coated sintered body of silicon nitride constituted by a sintered substrate of silicon nitride and a coating layer formed on the surfaces of said sintered substrate, wherein said coating layer comprises a crystalline phase of $RE_2Si_2O_7$ and/or $RE_2SiO_5$ (RE=rare earth element), said crystalline phase having an average crystalline grain diameter of not smaller than 0.1 $\mu$m, and the excess amount of $SiO_2$ contained in the coating layer being not larger than 10 mole %.

That is, the present invention is based on a discovery that excellent properties of the coating layer can be maintained for extended periods of time upon controlling the grain diameter and amount of oxygen in the crystalline phase in the coating layer. By controlling them as described above, the inventors have succeeded in maintaining a large adhesive force of the coating layer even in a high-temperature zone of from about 800 to about 1600° C. and in effectively avoiding a change (deterioration) in the corrosion resistance of the coating layer with the passage of time.

In the present invention, for example, since the silicon oxide exists in a decreased amount in the grain boundaries of the crystalline phase of $RE_2Si_2O_7$ or $RE_2SiO_5$, the coating layer imparts improved corrosion resistance against water. Besides, since the crystalline phase has an average crystalline grain diameter of not smaller than 0.1 $\mu$m, mechanical properties are improved and the coating layer is prevented from being broken down.

In the above-mentioned sintered substrate of silicon nitride having the coating layer on the surfaces thereof, it is desired that a crystalline phase exists on the grain boundaries of the silicon nitride particles. Then, the grain boundaries of the silicon nitride particles are crystallized exhibiting strikingly improved strength at high temperatures and resistance against the creeping as compared to those of which the grain boundaries are amorphous.

It is further desired that the crystalline phase same as that of the coating layer is precipitated on the grain boundaries of the silicon nitride particles. This enhances the intimate adhesion between the coating layer and the sintered body of silicon nitride which is a substrate, and the coating layer becomes less likely to be peeled off the surface of the substrate.

It is further desired that the sintered substrate of silicon nitride contains the silicon nitride in an amount of from 70 to 99 mole %, the rare earth element (RE) in an amount of from 0.5 to 10 mole % calculated as an oxide thereof, and excess of oxygen at a molar ratio expressed by the following formula, $$SiO_2/RE_2O_3$$

wherein $SiO_2$ is an amount (mols) of excess oxygen calculated as $SiO_2$, and $RE_2O_3$ is an amount (mols) of the rare earth element calculated as an oxide thereof, of not smaller than 2.

This makes it possible to make dense the sintered body of silicon nitride which is the substrate, to increase the bonding force between the sintered body of silicon nitride (substrate) and the coating layer, to suppress peeling and wear even when the sintered body of silicon nitride is exposed to a gas of a high temperature, high pressure and a high velocity, and to greatly improve resistance against the oxidation, resistance against the erosion and resistance against the corrosion.

It is further desired that the coating layer has a porosity of not larger than 10%, particularly, not larger than 5% and, more particularly, not larger than 2%. This further enhances the mechanical strength of the coating layer and resistance against the corrosion.

In the present invention, further, it is desired that the sintered substrate of silicon nitride contains fine hard particles having an average particle diameter of from 1 to 5 $\mu$m in an amount of not larger than 50 parts by weight per 100 parts by weight of the sum of the silicon nitride, the rare earth element calculated as an oxide thereof and excess of oxygen calculated as silicon oxide. The fine hard particles work to suitably suppress the growth of silicon nitride crystalline particles. Dispersion of such fine particles minimizes the phenomenon of breakage caused by the presence of large crystalline particles in the ordinary sintered body of silicon nitride, and work to increase the strength at high temperatures. It is further allowed to enhance the toughness against the breakage and to suppress the phenomenon of breakage of parts of the sintered body of silicon nitride caused by pitching.

It is desired that a protection layer of a crystalline phase of $RE_2Si_2O_7$ and/or $RE_2SiO_5$ (RE is a rare earth element) is further formed on the above coating layer, the protection layer having a porosity of from 5 to 30%, which is larger than the porosity of the above coating layer. This makes it possible to prevent the occurrence of cracks by relaxing the stress generated in the coating layer as well as to increase the entire thickness and, hence, to extend the life of the product.

As the fine hard particles, there can be preferably used a silicide of Ta, Nb, Mo or W, or SiC.

DETAILED DESCRIPTION OF THE INVENTION (Coating Layer)

In the surface-coated sintered body of silicon nitride of the present invention, it is important that the coating layer on the surfaces of the sintered substrate of silicon nitride is formed of a crystalline phase of a rare earth element (RE) compound, i.e., formed of a crystalline phase of a compound expressed by:

$RE_2Si_2O_7$ (disilicate) or $RE_2SiO_5$ (monosilicate).

The coating layer formed of $RE_2Si_2O_7$ (disilicate) or $RE_2SiO_5$ (monosilicate) remains very stable even in an oxidizing atmosphere of a high temperature compared to an existing protection film formed of $SiO_2$, $ZrO_2$, $Al_2O_3$, mullite, cordierite or YAG, and exhibits excellent resistance against corrosion. It further exhibits a melting point of as high as from 1600 to 1800° C. and, hence, exhibits an excellent resistance against heat and a long life at high temperatures.

In the present invention, further, it is important that the average crystalline particle diameter of the crystalline phase in the coating layer is not smaller than 0.1 $\mu$m and, preferably, in a range of from 10 to 100 $\mu$m, more preferably, in a range of from 30 to 70 $\mu$m and that excess amount of $SiO_2$ contained in the coating layer is not larger than 10 mole %, preferably, not larger than 5 mole %, more preferably, not larger than 2 mole % and, most preferably, not larger than 1 mole %.

Namely, according to the present invention, the crystalline phase of $RE_2Si_2O_7$ (disilicate) or $RE_2SiO_5$ (monosilicate) itself has a very excellent resistance against the corrosion and, hence, the coating layer exhibits an excellent resistance against the corrosion. Even though the above crystalline phase has a good resistance against the corrosion, however, the coating layer is polycrystalline containing crystalline grain boundaries. Here, impurity oxygen (excess of oxygen) that does not contribute to forming the crystalline phase but existing as $SiO_2$ on the crystalline grain boundaries, reacts with water, i.e., $SiO_2$ (excess of $SiO_2$) reacts with water and is vaporized. Namely, $SiO_2$ flows away together with the combustion gas and, hence, the grain boundary phase becomes missing, the coating layer tends to be broken, and the sintered body of silicon nitride which is a substrate tends to be easily corroded through the void grain boundary phase.

According to the present invention, therefore, the amount of excess $SiO_2$ in the grain boundary phase due to excess of oxygen is decreased to lie within the above-mentioned range to suppress the formation of the grain boundary phase and, hence, to prevent the diffusion of oxygen or water vapor through the grain boundaries of crystals in the coating layer.

It is most desired that the lower-limit value of the amount of excess $SiO_2$ is 0. When the amount of $SiO_2$ in the whole coating layer is smaller than the stoichiometric composition of disilicate or monosilicate, however, there often precipitates a nitrogen-containing crystalline phase such as YAM or apatite in addition to the disilicate or the monosilicate. It is, therefore, more desired that the $SiO_2/RE_2O_3$ ratio (molar ratio) in the coating film is from 1.9 to 2.3 when the coating film consists of the disilicate only, that the $SiO_2/RE_2O_3$ ratio is from 0.9 to 1.2 when the coating film consists of the monosilicate only, and that the $SiO_2/RE_2O_3$ ratio is in a range of from 0.9 to 2.3 when the coating layer consists of mixed crystals of the disilicate and the monosilicate.

When the average particle diameter of crystals forming the coating layer is smaller than the above-mentioned range, the toughness against the breakage decreases, and the coating layer tends to be cracked and broken when it receives a shock caused by the collision of fine particles impinging upon it at high speeds. To prevent the occurrence of crack in the coating layer and peeling, therefore, it is important that the crystals forming the coating layer have an average grain diameter which is not smaller than 0.1 μm.

According to the present invention, the rare earth element which is a component constituting the crystalline phase pertains to the Group 3a of periodic table and its concrete examples include Y, Lu, Yb, Er, Dy, Ho, Sm, Tb, Sc, Gd and Tm. Among them, Lu, Yb, Er and Y are preferred. Both the disilicate phase and the monosilicate phase of Lu, Yb, Er and Y have high melting points, and offer excellent strengths at high temperatures and resistance against the oxidation. Besides, the starting material for Y is easily available, Sm is inexpensive, and Yb, Lu and Er give advantages in regard to being easily sintered and exhibiting large strengths.

It is desired that the above-mentioned coating layer has a porosity of not larger than 10%, preferably, not larger than 5%, more preferably, not larger than 2% and, most preferably, not larger than 1%. By controlling the porosity so as to lie within the above-mentioned range, the coating layer chiefly contains closed pores and, hence, exhibits further increased mechanical strength and improved resistance against the corrosion.

According to the present invention, a protection layer may be formed on the surface of the above-mentioned coating layer. It is desired that the protection layer comprises a crystalline phase of a rare earth element, i.e., comprises a crystalline phase of a compound represented by the following formula, $RE_2Si_2O_7$ (disilicate) or $RE_2SiO_5$ (monosilicate).

More desirably, the rare earth element in the protection layer may be the same as the rare earth element constituting the coating layer, so that the protection layer and the coating layer are highly firmly adhered together.

It is desired that the protection layer has a porosity of from 5 to 30% and, particularly, from 10 to 25%, and that the porosity of the protection layer is larger than the porosity of the coating layer. Upon controlling the porosities of the protection layer and of the coating layer as described above, it is allowed to further relax the stress generated in the coating layer, to effectively prevent the occurrence of cracks in the protection layer, to substantially increase the thickness of the crystalline phase and, hence, to lengthen the life of the coating layer.

(Sintered Substrate of Silicon Nitride)

In the sintered body of silicon nitride which is a substrate having the above-mentioned coating layer formed on the surfaces thereof according to the present invention, it is desired that the crystalline phase exists on the grain boundaries of the silicon nitride crystalline phase which is a main phase.

That is, even when the coating layer is formed on the surfaces of the sintered body of silicon nitride which is the substrate, oxygen diffuses into the interior over a long period of time through the grain boundaries in the coating layer and arrives at the sintered body of silicon nitride. If the sintered body is oxidized, therefore, the mechanical properties are deteriorated. For example, the crystals of silicon nitride are transformed into a silicon oxide which finally scatters as SiO, accounting for a cause of reduction in the thickness. With the crystalline phase being made present on the grain boundaries of the silicon nitride particles in the sintered body of silicon nitride, however, the crystals of silicon nitride are protected from the oxidation and corrosion, retarding, for example, the rate of oxidation of the sintered body of silicon nitride, effectively suppressing a drop of mechanical properties and a reduction of thickness caused by the oxidation as oxygen diffuses into the interior of the sintered body, making it possible to draw out the properties of the sintered body of silicon nitride to a maximum degree and to strikingly extend the life.

It is further desired that the above-mentioned crystalline phase present on the grain boundaries of the silicon nitride particles is formed of crystals containing, for example, a rare earth element (RE), Si (silicon) and O (oxygen), and is, more preferably, a disilicate phase or a monosilicate phase represented by the formula $RE_2Si_2O_7$ or $RE_2SiO_5$ like the above-mentioned coating layer. That is, with the crystalline phase being made present on the grain boundaries of crystal particles of silicon nitride, the coating layer exhibits good wettability to the surface of the sintered substrate of silicon nitride. Since the crystalline phase on the grain boundaries is continuing from the substrate to the coating layer, the adhering force becomes strong between the two, the difference in the thermal expansion can be decreased between the substrate and the coating layer, and the coating layer is more effectively prevented from being peeled off.

In the present invention, it is desired that the sintered product of silicon nitride used as a substrate contains a rare earth element and excess of oxygen in addition to silicon nitride which is a chief component.

It is desired that the content of silicon nitride is in a range of from 70 to 99 mol % and, particularly, from 85 to 99 mol % so as to exhibit the strength to a sufficient degree at high temperatures. The silicon nitride may further contain Al and 0 as a solid solution to form SIALON.

The rare earth elements stem from the sintering assistant and constitute the above-mentioned grain boundary crystalline phase. As the rare earth elements, there can be exemplified those which are the same as the rare earth elements present in the crystalline phase forming the coating layer. It is desired that the content of the rare earth elements in the sintered substrate is in a range of from 0.5 to 10 mol % and, particularly, from 1 to 7 mol % calculated as oxides thereof in order to obtain a sintered body of silicon nitride which is dense having an excellent strength at high temperatures and resistance against the creeping at high temperatures. For example, when the content of the rare earth element is smaller than the above-mentioned range, the sintering property is deteriorated making it difficult to obtain a densely sintered substrate of silicon nitride. When the rare earth elements are contained in amounts larger than the above range, on the other hand, the strength tends to decrease at high temperatures and the resistance against the creeping tends to decrease at high temperatures.

Excess of oxygen exists chiefly as $SiO_2$, and stands for the amount of oxygen obtained by subtracting the amount of oxygen used for the oxides of rare earth elements from the total amount of oxygen in the sintered substrate of silicon nitride. In the present invention, it is desired that the amount of excess oxygen as expressed by a molar ratio by the following formula, $SiO_2/RE_2O_3$ wherein $SiO_2$ is an amount (mols) of excess oxygen calculated as $SiO_2$, and $RE_2O_3$ is an amount (mols) of the rare earth element calculated as an oxide thereof, is not smaller than 2, preferably, in a range of from 2 to 3.5 and, most preferably, from 2.1 to 2.7. Upon containing excess of oxygen in the above-mentioned amount, it is allowed to form, on the grain boundaries, the disilicate phase or the monosilicate phase having a large resistance against the oxidation and corrosion. When the amount of excess oxygen is smaller than the above range, it becomes difficult to have the crystalline phase precipitated on the grain boundaries.

The sintered substrate of silicon nitride used in the present invention may contain fine hard particles having an average particle diameter of from 1 to 5 μm in addition to the above-mentioned components. As the fine hard particles, there can be used at least one selected, for example, from silicides of Ta, Nb, Mo and W, and SiC. Residual stress that generates due to a suitable degree of difference in the thermal expansion between the fine hard particles and the main crystals of silicon nitride, prevents the development of cracks, improves the toughness against the breakage and enhances the strength at high temperatures. It is desired that the fine hard particles are usually used in an amount of not larger than 50 parts by weight and, particularly, from 1 to 40 parts by weight per 100 parts by weight of the total amount of silicon nitride, rare earth elements calculated as oxides thereof and excess of oxygen (calculated as silicon oxide). When the fine hard particles have an average particle diameter that lies outside the above-mentioned range, or when the amount of use thereof is smaller than the above-mentioned range, development of cracks is not suppressed, and the toughness against the breakage and the strength at high temperatures are not improved to a satisfactory degree.

In the present invention, further, the sintered substrate may often contain metal components such as Al, Mg, Ca and Fe. These metals, however, form oxides of low melting points to hinder the crystallization on the grain boundaries and to deteriorate the strength at high temperatures. It is therefore desired that the amounts of these metals are suppressed to be not larger than 1 mol %, particularly, not larger than 0.5 mol % and, more desirably, not larger than 0.1 mol % calculated as oxides thereof.

(Preparation of Surface-Coated Sintered Body of Silicon Nitride)

The surface-coated sintered body of silicon nitride of the present invention is obtained by preparing a sintered substrate of silicon nitride and, then, forming the above-mentioned coating layer on the surfaces of the substrate.

Preparation of the Sintered Substrate of Silicon Nitride

A mixture powder of a silicon nitride powder and an oxide powder ($RE_2O_3$) of a rare earth element (of the Group 3a of periodic table) is used as a starting material for preparing the sintered substrate. As required, the mixture powder further contains an $SiO_2$ powder for precipitating the crystalline phase on the grain boundaries and the above-mentioned fine pard particles.

The silicon nitride powder may be of either the α-type or the β-type having a particle diameter of from 0.4 to 1.2 μm, containing cationic impurities in an amount of not larger than 1% by weight and, particularly, not larger than 0.5% by weight and containing impurity oxygen in an amount of from 0.5 to 2.0% by weight. The silicon nitride powder may be prepared by either the direct nitration method or the imide decomposition method. It is also allowable to use a SIALON powder.

Instead of using the $RE_2O_3$ powder or the $SiO_2$ powder, it is also allowable to use a powder of a composite oxide of $RE_2O_3$ and $SiO_2$ or a compound powder of silicon nitride, $RE_2O_3$ and $SiO_2$.

In preparing the mixture powder, the ratio of mixing the powders is so adjusted as to satisfy the composition of the above-mentioned sintered substrate. In order for the amount of excess oxygen to satisfy, for example, a predetermined molar ratio $SiO_2/RE_2O_3$, the amount of addition of the rare earth element oxide such as $Lu_2O_3$ and the $SiO_2$ powder is adjusted by taking into consideration oxygen that is unavoidably contained in the silicon nitride and oxygen adsorbed in the step of preparation as $SiO_2$ component.

The powders are weighed at predetermined ratios, mixed together to a sufficient degree by using a vibration mill, a rotary mill or a barrel mill, and the obtained mixture powder is molded into a desired shape by any molding means such as metal mold press, cast molding, sludge molding, extrusion molding, injection molding or cold hydrostatic pressure press. The molded article is then fired to obtain a sintered substrate of silicon nitride used in the present invention.

The firing is usually conducted in the pressurized nitrogen gas at a firing temperature of desirably from 1800 to 2000° C. Upon the firing under such conditions, it is allowed to obtain a densely sintered substrate having a relative density of not smaller than 98%. When the firing temperature exceeds 2000° C., the crystals of silicon nitride grow to deteriorate the strength. When the firing temperature is lower than 1800° C., it becomes difficult to densely sinter the substrate.

The firing can be further followed by the hot hydrostatic pressure firing (HIP) to further increase the density. Further, the crystallization on the grain boundaries can be promoted and the characteristics can be further improved by gradually cooling the sintered body through a cooling step after the firing or by heat-treating the sintered body at 1000 to 1700° C. Depending upon the cases, further, the sintered substrate can be obtained by a glass capsule hot hydrostatic pressure press (HIP) method or a glass bath hot hydrostatic pressure press(HIP) method.

When a high degree of dimensional precision is required, the molded article is prepared by replacing part of the silicon nitride powder by the Si powder, and is transformed into $Si_3N_4$ through the heat treatment at 800 to 1500° C. in a nitrogen-containing atmosphere to enhance the density of the molded article, followed by firing under the above-mentioned firing conditions to decrease the contraction during the firing.

Formation of Coating Layer

A coating layer comprising a monosilicate phase or a disilicate phase of the above-mentioned rare earth element is formed on the surfaces of the sintered substrate of silicon nitride obtained as described above.

The coating layer can be formed by a thin film-forming method such as vaporization method, CVD method or sputtering method, or by a melt-injection method or a slurry-dipping method. In the present invention, the amount of excess $SiO_2$ must have been strictly controlled in the coating layer. It is therefore desired to employ the melt-injection method or the slurry-dipping method and, particularly, the slurry-dipping method from the standpoint of easily forming the coating layer.

For example, there is used a powder of composite oxide of $SiO_2$ and $RE_2O_3$ or a mixture powder of the $SiO_2$ powder and the $RE_2O_3$ powder, the amount of excess $SiO_2$ in the powder is adjusted to lie within a predetermined range to thereby prepare a slurry of the powder. The slurry is blown by spraying onto the surfaces of the sintered substrate prepared as described above, or the slurry is evenly applied by dipping onto the surfaces of the sintered substrate followed by the heat treatment to form a desired coating layer comprising a crystalline phase.

The temperature of the heat treatment is generally from 1300 to 1800° C. and, particularly, from 1400 to 1750° C.

though it may vary depending upon the kind of $RE_2O_3$ that is used. When the temperature of the heat treatment is lower than the above range, it becomes difficult to have a desired crystalline phase precipitated, or the coating layer that is formed contains much pores and fails to sere as a protection film. When the temperature of the heat treatment is higher than the above range, the $SiO_2$ diffuses and, hence, the predetermined crystalline phase is not precipitated. Besides, the viscosity becomes so low that the coating layer is not easily formed.

The atmosphere for heat treatment may be an oxidizing atmosphere or an inert atmosphere such as of nitrogen or argon. When heat-treated in a nitrogen or argon atmosphere at a high temperature of not lower than, for example, 1300° C., the $SiO_2$ volatilizes and the composition of the coating layer may vary to a large extent. In this case, therefore, it is desired that an SiO gas is generated in the atmosphere during the heat treatment at a high temperature from the standpoint of maintaining the composition of the coating layer to be substantially the same as the starting composition. To generate the SiO gas, further, a mixture powder of $Si/SiO_2$ may be placed on the furnace for heat treatment.

It is desired that both the $SiO_2$ powder and the $RE_2O_3$ powder used as starting materials have purities of not smaller than 99.9%. It is further desired that the mixture powder has a molar ratio $SiO_2/RE_2O_3$ of from 1.9 to 3.0, preferably, from 2.0 to 2.5 and, more preferably, from 2.1 to 2.3 in order to decrease the excess of $SiO_2$ in the coating layer and to realize the coating layer having a little-varying resistance against the corrosion.

It is further possible to simultaneously form the sintered substrate and the coating layer on the surfaces by evenly applying, by the same method as the one described above, the above-mentioned slurry onto the surfaces of the molded article prepared through the steps of forming the sintered substrate, followed by firing.

The thus obtained surface-coated sintered body of silicon nitride of the present invention features a large adhering force between the coating layer and the sintered substrate, exhibits excellent resistance against the oxidation, resistance against the corrosion, resistance against the erosion and mechanical properties, and is very useful as engine parts used in a high-temperature region of, for example, from 800 to 1500° C. for extended periods of time.

It is allowable to further form a protection layer on the surface of the coating layer. The protection layer can be formed by the same method as that of forming the coating layer, by applying the above-mentioned slurry onto the surface of the coating layer followed by heat treatment. Thus, the desired protection layer comprising a crystalline phase is formed.

The heat-treatment temperature may vary depending upon the kind of $RE_2O_3$ that is used but is, generally, from 1200 to 1700° C. and, particularly, from 1300 to 1600° C. The time for conducting the heat treatment is so adjusted that the protection layer will have a porosity of from 5 to 30% and that the porosity of the protection layer will become greater than the porosity of the coating layer.

EXAMPLES (Experiment 1)

As the starting powders for preparing a sintered substrate, there were used the following silicon nitride powder, powder of an oxide of a rare earth element and silicon oxide powder.

Silicon Nitride Powder
  BET specific surface area: 9 $m^2/g$
  α-Transformation ratio of silicon nitride: 99%
  Amount of oxygen: 1.1% by weight
  Amount of cationic metal impurities such as Al, Mg, Ca, Fe, etc.: 30 ppm or less Powder of Oxide of Rare Earth Element
  RE: Yb
  Purity: 99%
  Average particle diameter: 1.5 μm Silicon Oxide Powder
  Purity: 99.9%
  Average particle diameter: 2 μm There was prepared a mixture powder comprising 89.5 mol % of the silicon nitride powder, 3 mol % of the powder of the oxide of the rare earth element and 7.5 mol % of the silicon oxide powder. To the mixture powder were added a binder and a methanol that served as a solvent. The mixture was mixed and pulverized by a rotary mill by using silicon nitride balls for 50 hours to prepare a slurry thereof.

The obtained slurry was dried, and was molded by a rubber press under a pressure of 3 $t/cm^2$ to obtain a molded article having a diameter of 60 mm and a thickness of 20 mm.

The molded article was fired by the firing methods and under the firing conditions shown in Table 1 to obtain sintered substrates of silicon nitride. A crystalline phase of $RE_2Si_2O_7$ (disilicate, R2S) had been precipitated on the grain boundaries of all sintered substrates.

In the firing methods shown in Table 1, "G" represents the gas-pressure firing (GPS), "H" represents firing by the glass bath hot hydrostatic pressure press (HIP), and "G +H" represents the HIP firing at 1700° C. under a nitrogen pressure of 196 MPa for one hour after the gas-pressure firing at 190° C. (the total time of firing was 10 hours).

In Table 1, the amount of $SiO_2$ in the sintered substrate was found by pulverizing the sintered substrate, finding the total amount of oxygen by chemical analysis, and calculating as $SiO_2$ the amount of oxygen excluding the amount of oxygen in the oxide of a rare earth metal that was added.

Next, the mixture powder of the $RE_2O_3$ (RE=Lu) powder and the $SiO_2$ powder was dispersed in methanol under the conditions shown in Table 1 to prepare a slurry thereof which was then evenly applied by spraying onto the surfaces of the sintered substrate obtained as described above such that the thickness thereof was 120 μm. The slurry was, then, dried and was heat-treated in a nitrogen atmosphere in a furnace in which the $Si/SiO_2$ mixture powder was placed under the conditions shown in Table 1 to obtain the surface-coated sintered bodies of silicon nitride (samples Nos. 1 to 12).

For the purpose of comparison, the surface-coated sintered bodies of silicon nitride (samples Nos. 13 to 16) were obtained in the same manner as described above but using the $SiO_2$ powder, the $ZrO_2$ powder or the $Al_2O_3$ powder instead of the above-mentioned mixture powder.

The obtained sintered bodies were measured for their properties according to the methods described below to obtain results as shown in Table 1.

Porosity (Coating Layer)
  Calculated According to Archimedes' Method. Average Grain Diameter (Coating Layer) of Crystalline Phase
  Average values of long diameters and short diameters of grains as found from a photograph of a scanning electron microscope (SEM) was regarded as an average particle diameter. The average value was obtained from 50 particles.

Flexural Strength
  The sintered body of the sample was cut into 3×4×40 mm, polished, and was measured for its four-point flexural strength at room temperature and at 1500° C. (represented by HT in Table 1) in compliance with JIS-R1601. Measurement was taken from ten samples to obtain average values as shown in Table 1.

Toughness Against the Breakage

Measured relying upon the Vicker's indentation in compliance with JIS-R1607.

Increase of Weight Due to Oxidation

As a scale for representing the resistance against the oxidation, the sample that was sintered was maintained in an open air heated at 1500° C. for 100 hours to measure the increase in the weight due to oxidation.

Reduction of Thickness

The sample that was sintered was exposed to a gas stream heated at 1200° C. of a pressure of 0.4 MPa at a gas flow velocity of 50 m/s for 100 hours to measure the reduction of the thickness.

Identifying the Crystalline Phases

Crystals on the grain boundaries of the sintered substrate and crystals of the coating layer were identified by the x-ray diffraction measurement. In Table 1, RS represents the monosilicate phase and R2S represents the disilicate phase.

From the results of Table 1, the samples Nos. 1 to 3 and 6 to 12 of the present invention exhibited strengths at room temperature of not smaller than 800 MPa, strengths at high temperatures (HT) of not smaller than 540 MPa, toughnesses against the breakage of not smaller than 5.8 MPa·m$^{1/2}$, increase in the weight due to oxidation of not larger than 0.03 mg/cm$^2$ and thickness reduction of not larger than 10 μm.

On the other hand, the samples Nos. 13 to 16 having a coating layer formed by neither the monosilicate nor the disilicate, exhibited a thickness reduction of as large as 200 μm or more and very poor resistance against the corrosion.

Further, the sample No. 4 having an amount of excess oxygen of as large as 25 mol %, exhibited a thickness reduction of as large as 300 μm or more and a very poor resistance against the corrosion.

The sample No. 5 of which the crystalline phase in the coating layer possessed an average grain diameter as small as 0.05 μm, exhibited poor mechanical properties, such as a strength at room temperature of 720 MPa, a strength at a

TABLE 1

| | Sintered substrate | | | | Coating layer | | | | | | |
|---|---|---|---|---|---|---|---|---|---|---|---|
| | Firing condition | | | Grain boundary | Composition | | | | Firing | | Average grain |
| Sample No. | Method | Temp. (° C.) | Time (H) | crystal phase | Main component | | SiO$_2$ mol % | SiO$_2$/ RE$_2$O$_3$ | temp. (° C.) | Crystal phase | Porosity (%) | diameter (μm) |
| | | | | | Kinds | mol % | | | | | | |
| 1 | G | 1900 | 10 | R2S | Lu$_2$O$_3$ | 50 | 50 | 1 | 1700 | RS | 1 | 5 |
| 2 | G | 1900 | 10 | R2S | Lu$_2$O$_3$ | 33 | 67 | 2.03 | 1700 | R2S | 0 | 5 |
| 3 | G | 1900 | 10 | R2S | Lu$_2$O$_3$ | 30 | 70 | 2.333 | 1700 | R2S | 3 | 5 |
| *4 | G | 1900 | 10 | R2S | Lu$_2$O$_3$ | 29 | 71 | 2.448 | 1700 | R2S | 10 | 5 |
| *5 | G | 1900 | 10 | R2S | Lu$_2$O$_3$ | 33 | 67 | 2.03 | 1400 | R2S | 10 | 0.05 |
| 6 | G | 1900 | 10 | R2S | Lu$_2$O$_3$ | 33 | 67 | 2.03 | 1500 | R2S | 5 | 0.1 |
| 7 | G | 1900 | 10 | R2S | Lu$_2$O$_3$ | 33 | 67 | 2.03 | 1600 | R2S | 3 | 0.5 |
| 8 | G | 1900 | 10 | R2S | Lu$_2$O$_3$ | 33 | 67 | 2.03 | 1650 | R2S | 0 | 5 |
| 9 | G | 1900 | 10 | R2S | Lu$_2$O$_3$ | 33 | 67 | 2.03 | 1750 | R2S | 0 | 15 |
| 10 | G | 1900 | 10 | R2S | Lu$_2$O$_3$ | 33 | 67 | 2.03 | 1800 | R2S | 0 | 30 |
| 11 | G + H | 1900 | 10 | R2S | Lu$_2$O$_3$ | 33 | 67 | 2.03 | 1700 | R2S | 0 | 5 |
| 12 | H | 1700 | 1 | R2S | Lu$_2$O$_3$ | 33 | 67 | 2.03 | 1700 | R2S | 0 | 5 |
| *13 | G | 1900 | 10 | R2S | Lu$_2$O$_3$ | 35 | 65 | 1.857 | 1700 | YAM | 0 | 3 |
| *14 | G | 1900 | 10 | R2S | SiO$_2$ | 100 | 0 | 0 | 1600 | SiO$_2$ glass | 5 | 1 |
| *15 | G | 1900 | 10 | R2S | ZrO$_2$ | 100 | 0 | 0 | 1500 | ZrO$_2$ | 5 | 3 |
| *16 | G | 1900 | 10 | R2S | Al$_2$O$_3$ | 100 | 0 | 0 | 1500 | Al$_2$O$_3$ | 3 | 3 |

| | Surface-coated sintered body | | | | |
|---|---|---|---|---|---|
| | Flexural strength | | | Increase of weight due to | Reduction of |
| Sample No. | room temp. (MPa) | HT (MPa) | Toughness (Mpa · m$^{1/2}$) | oxidation (mg/cm$^2$) | thickness (μm) |
| 1 | 880 | 640 | 5.9 | 0.02 | 1 |
| 2 | 810 | 590 | 5.8 | 0.01 | 3 |
| 3 | 800 | 590 | 6.3 | 0.03 | 10 |
| *4 | 810 | 600 | 6.2 | 0.01 | 300 |
| *5 | 720 | 490 | 5.1 | 0.01 | 2 |
| 6 | 800 | 540 | 5.8 | 0.01 | 1 |
| 7 | 810 | 570 | 6.2 | 0.02 | 1 |
| 8 | 820 | 550 | 6.0 | 0.01 | 1 |
| 9 | 850 | 540 | 6.1 | 0.02 | 1 |
| 10 | 820 | 570 | 6.2 | 0.02 | 1 |
| 11 | 910 | 680 | 5.8 | 0.01 | 2 |
| 12 | 1050 | 730 | 5.8 | 0.01 | 1 |
| *13 | 810 | 530 | 5.5 | 1.15 | 400 |
| *14 | 770 | 480 | 5.4 | 0.02 | 850 |
| *15 | 700 | 430 | 5.7 | 0.03 | 350 |
| *16 | 790 | 450 | 6.0 | 0.03 | 200 |

Samples marked with * lie outside the scope of the invention.
RS: monosilicate
R2S: disilicate high temperature (HT) of 490 MPa, and a toughness against the breakage of 5.1 MPa·m$^{1/2}$, and easily developed cracks.

In Table 2, there were used the same silicon nitride powder and the silicon oxide powder as those used in Experiment 1. To these powders were mixed the Si powder or powders of oxides of various rare earth elements having an average particle diameter of 1.5 μm. The slurries were prepared, dried and molded in the same manner as in Experiment 1 to obtain molded articles having a diameter of 60 mm and a thickness of 20 mm.

The obtained molded articles were fired by GPS in a nitrogen atmosphere at 1900° C. to obtain sintered substrates.

Next, the mixture powder of RE$_2$O$_3$ (RE is as shown in Table 2) and SiO$_2$ was dispersed in methanol to prepare a slurry which was, then, evenly sprayed onto the surfaces of the sintered substrates (maintaining a thickness of 120 μm). After dried, the slurry was heat-treated at 1500 to 1700° C. to obtain surface-coated sintered bodies (samples Nos. 17 to 45).

The obtained sintered bodies were evaluated by the same methods as those of Experiment 1 to obtain results as shown in Table 2. Relative specific gravities of the sintered substrates were calculated according to Archimedes' method.

TABLE 2

| Sample No. | Sintered substrate | | | | | Relative density (%) | Coating layer | | | |
|---|---|---|---|---|---|---|---|---|---|---|
| | Si$_3$N$_4$ mol % | Si mol % | RE$_2$O$_3$ Kinds | RE$_2$O$_3$ mol % | SiO$_2$ mol % | SiO$_2$/RE$_2$O$_3$ | | RE$_2$O$_3$ Kinds | RE$_2$O$_3$ mol % | SiO$_2$ mol % | SiO$_2$/RE$_2$O$_3$ |

| Sample No. | Si$_3$N$_4$ mol % | Si mol % | RE$_2$O$_3$ Kinds | RE$_2$O$_3$ mol % | SiO$_2$ mol % | SiO$_2$/RE$_2$O$_3$ | density (%) | RE$_2$O$_3$ Kinds | RE$_2$O$_3$ mol % | SiO$_2$ mol % | SiO$_2$/RE$_2$O$_3$ |
|---|---|---|---|---|---|---|---|---|---|---|---|
| 17 | 96.9 | 0 | Yb$_2$O$_3$ | 1 | 2.1 | 2.1 | 99 | Yb$_2$O$_3$ | 33.3 | 66.7 | 2.003 |
| 18 | 90.7 | 0 | Yb$_2$O$_3$ | 3 | 6.3 | 2.1 | 100 | Yb$_2$O$_3$ | 33.3 | 66.7 | 2.003 |
| 19 | 78.3 | 0 | Yb$_2$O$_3$ | 7 | 14.7 | 2.1 | 100 | Yb$_2$O$_3$ | 33.3 | 66.7 | 2.003 |
| 20 | 80.7 | 10 | Yb$_2$O$_3$ | 3 | 6.3 | 2.1 | 100 | Yb$_2$O$_3$ | 33.3 | 66.7 | 2.003 |
| 21 | 60.7 | 30 | Yb$_2$O$_3$ | 3 | 6.3 | 2.1 | 100 | Yb$_2$O$_3$ | 33.3 | 66.7 | 2.003 |
| 22 | 40.7 | 50 | Yb$_2$O$_3$ | 3 | 6.3 | 2.1 | 100 | Yb$_2$O$_3$ | 33.3 | 66.7 | 2.003 |
| 23 | 10.7 | 80 | Yb$_2$O$_3$ | 3 | 6.3 | 2.1 | 100 | Yb$_2$O$_3$ | 33.3 | 66.7 | 2.003 |
| 24 | 91 | 0 | Yb$_2$O$_3$ | 3 | 6 | 2.0 | 100 | Yb$_2$O$_3$ | 33.3 | 66.7 | 2.003 |
| 25 | 90.4 | 0 | Yb$_2$O$_3$ | 3 | 6.6 | 2.2 | 100 | Yb$_2$O$_3$ | 33.3 | 66.7 | 2.003 |
| 26 | 88 | 0 | Yb$_2$O$_3$ | 3 | 9 | 3.0 | 100 | Yb$_2$O$_3$ | 33.3 | 66.7 | 2.003 |
| 27 | 86.5 | 0 | Yb$_2$O$_3$ | 3 | 10.5 | 3.5 | 100 | Yb$_2$O$_3$ | 33.3 | 66.7 | 2.003 |
| 28 | 96.9 | 0 | Lu$_2$O$_3$ | 1 | 2.1 | 2.1 | 100 | Lu$_2$O$_3$ | 33.3 | 66.7 | 2.003 |
| 29 | 90.7 | 0 | Lu$_2$O$_3$ | 3 | 6.3 | 2.1 | 100 | Lu$_2$O$_3$ | 33.3 | 66.7 | 2.003 |
| 30 | 74 | 0 | Lu$_2$O$_3$ | 8.5 | 17.5 | 2.1 | 100 | Lu$_2$O$_3$ | 33.3 | 66.7 | 2.003 |
| 31 | 88 | 0 | Lu$_2$O$_3$ | 3 | 9 | 3.0 | 100 | Lu$_2$O$_3$ | 33.3 | 66.7 | 2.003 |
| 32 | 80.7 | 10 | Lu$_2$O$_3$ | 3 | 6.3 | 2.1 | 100 | Lu$_2$O$_3$ | 33.3 | 66.7 | 2.003 |
| 33 | 60.7 | 30 | Lu$_2$O$_3$ | 3 | 6.3 | 2.1 | 100 | Lu$_2$O$_3$ | 33.3 | 66.7 | 2.003 |
| 34 | 40.7 | 50 | Lu$_2$O$_3$ | 3 | 6.3 | 2.1 | 100 | Lu$_2$O$_3$ | 33.3 | 66.7 | 2.003 |
| 35 | 10.7 | 80 | Lu$_2$O$_3$ | 3 | 6.3 | 2.1 | 100 | Lu$_2$O$_3$ | 33.3 | 66.7 | 2.003 |
| 36 | 90.7 | 0 | Y$_2$O$_3$ | 3 | 6.3 | 2.1 | 100 | Y$_2$O$_3$ | 33.3 | 66.7 | 2.003 |
| 37 | 90.7 | 0 | Yb$_2$O$_3$ | 3 | 6.3 | 2.1 | 100 | Yb$_2$O$_3$ | 33.3 | 66.7 | 2.003 |
| 38 | 90.7 | 0 | Er$_2$O$_3$ | 3 | 6.3 | 2.1 | 100 | Er$_2$O$_3$ | 33.3 | 66.7 | 2.003 |
| 39 | 90.7 | 0 | Dy$_2$O$_3$ | 3 | 6.3 | 2.1 | 100 | Dy$_2$O$_3$ | 33.3 | 66.7 | 2.003 |
| 40 | 90.7 | 0 | Ho$_2$O$_3$ | 3 | 6.3 | 2.1 | 100 | Ho$_2$O$_3$ | 33.3 | 66.7 | 2.003 |
| 41 | 90.7 | 0 | Tb$_2$O$_3$ | 3 | 6.3 | 2.1 | 100 | Tb$_2$O$_3$ | 33.3 | 66.7 | 2.003 |
| 42 | 90.7 | 0 | Sc$_2$O$_3$ | 3 | 6.3 | 2.1 | 100 | Sc$_2$O$_3$ | 33.3 | 66.7 | 2.003 |
| 43 | 90.7 | 0 | Tm$_2$O$_3$ | 3 | 6.3 | 2.1 | 100 | Tm$_2$O$_3$ | 33.3 | 66.7 | 2.003 |
| 44 | 90.7 | 0 | Gd$_2$O$_3$ | 3 | 6.3 | 2.1 | 100 | Gd$_2$O$_3$ | 33.3 | 66.7 | 2.003 |
| 45 | 90.7 | 0 | Lu$_2$O$_3$ + Yb$_2$O$_3$ | 3 | 6.3 | 2.1 | 100 | Lu$_2$O$_3$ + Yb$_2$O$_3$ | 33.3 | 66.7 | 2.003 |

HT: 1500° C.

| Sample No. | Average grain diameter (μm) | Flexural strength Room temp. (MPa) | Flexural strength HT (MPa) | Toughness (MPa·m$^{1/2}$) | Increase of weight due to oxidation (mg/cm$^2$) | Reduction of thickness (μm) |
|---|---|---|---|---|---|---|
| 17 | 5 | 760 | 530 | 6.1 | 0.01 | 3 |
| 18 | 5 | 830 | 610 | 6.2 | 0.02 | 1 |
| 19 | 5 | 850 | 620 | 6.4 | 0.00 | 4 |
| 20 | 5 | 880 | 640 | 5.9 | 0.02 | 1 |
| 21 | 5 | 810 | 590 | 5.8 | 0.01 | 3 |
| 22 | 5 | 800 | 590 | 6.3 | 0.03 | 2 |
| 23 | 5 | 810 | 600 | 6.2 | 0.01 | 4 |
| 24 | 5 | 820 | 600 | 5.9 | 0.01 | 2 |
| 25 | 5 | 810 | 620 | 6.1 | 0.02 | 3 |
| 26 | 5 | 840 | 610 | 6.3 | 0.01 | 4 |
| 27 | 5 | 820 | 620 | 6.0 | 0.03 | 5 |
| 28 | 5 | 820 | 630 | 6.0 | 0.02 | 2 |
| 29 | 5 | 840 | 600 | 6.2 | 0.01 | 1 |
| 30 | 5 | 860 | 660 | 6.3 | 0.01 | 1 |
| 31 | 5 | 830 | 610 | 6.1 | 0.02 | 3 |
| 32 | 5 | 850 | 620 | 6.2 | 0.02 | 4 |
| 33 | 5 | 810 | 600 | 6.2 | 0.03 | 2 |

TABLE 2-continued

| 34 | 5 | 830 | 640 | 6.3 | 0.02 | 1 |
| 35 | 5 | 810 | 610 | 6.1 | 0.02 | 4 |
| 36 | 5 | 830 | 590 | 6.0 | 0.02 | 2 |
| 37 | 5 | 790 | 540 | 6.2 | 0.01 | 5 |
| 38 | 5 | 810 | 560 | 6.0 | 0.02 | 2 |
| 39 | 5 | 850 | 550 | 6.4 | 0.01 | 2 |
| 40 | 5 | 830 | 530 | 6.3 | 0.01 | 3 |
| 41 | 5 | 820 | 550 | 6.0 | 0.02 | 4 |
| 42 | 5 | 810 | 570 | 6.1 | 0.01 | 3 |
| 43 | 5 | 800 | 560 | 6.2 | 0.02 | 3 |
| 44 | 5 | 830 | 520 | 6.1 | 0.02 | 4 |
| 45 | 5 | 790 | 510 | 6.3 | 0.01 | 3 |

The samples Nos. 17 to 27 having a coating layer of $Yb_2Si_2O_7$ and having sintered substrates of different compositions of the present invention exhibited strengths at room temperature of not smaller than 760 MPa, strengths at high temperatures (HT) of not smaller than 530 MPa, toughnesses against the breakage of not smaller than 5.8 MPa·m$^{1/2}$, increase in the weight due to oxidation of not larger than 0.03 mg/cm$^2$ and thickness reduction of not larger than 5 μm.

Further, the samples Nos. 28 to 35 having the sintered substrates prepared by using $Lu_2O_3$ as the oxide of a rare earth metal exhibited strengths at room temperature of not smaller than 810 MPa, strengths at high temperatures (HT) of not smaller than 600 MPa, toughnesses against the breakage of not smaller than 6.0 MPa·m$^{1/2}$, increase in the weight due to oxidation of not larger than 0.03 mg/cm$^2$ and thickness reduction of not larger than 4 μm.

Further, the samples Nos. 36 to 45 having coating layers of different compositions exhibited strengths at room temperature of not smaller than 790 MPa, strengths at high temperatures (HT) of not smaller than 500 MPa, toughnesses against the breakage of not smaller than 5.8 MPa·m$^{1/2}$, increase in the weight due to oxidation of not larger than 0.03 mg/cm$^2$ and thickness reduction of not larger than 5 μm.

In particular, the samples Nos. 30 and 39 using, in the coating layer, the same element as the rare earth element in the sintered substrate, exhibited excellent mechanical properties such as strengths at room temperature of not smaller than 850 MPa, strengths at high temperatures (HT) of not smaller than 550 MPa, and toughnesses against the breakage of not smaller than 6.3 MPa·m$^{1/2}$, and did not easily peel off and developed little cracks.

(Experiment 3)

A mixture powder was prepared by mixing 3 mol % of the $Lu_2O_3$ powder and 7.5 mol % of the silicon oxide powder described below into 89.5 mol % of the silicon nitride powder used in Experiment 1.

$Lu_2O_3$ Powder:
  Purity, 99%
  Average particle diameter, 1.5 μm
Silicon Oxide Powder:
  Purity, 99.9%
  Average particle diameter, 2 μm To 100 parts by weight of the above mixture powder were added a silicon carbide powder (purity; 99%, average particle diameter; 0.8 μm) and a silicide powder (purity; 99%, average particle diameter; 1.4 μm) at weight percentages shown in Table 3 to prepare surface-coated sintered bodies (samples Nos. 46 to 54) in the same manner as in Experiment 1. The surface-coated sintered bodies were evaluated in the same manner as described above to obtain the results as shown in Table 3.

In all of the above sintered bodies, the grain boundary phase in the sintered substrates and the coating layers had been all formed of $RE_2O_3 \cdot 2SiO_2$.

TABLE 3

| | Sintered substrate | | | Coating layer | | | | | | Surface-coated sintered body | | | | |
| | Fine hard particles | | Firing | Preparation conditions | | | | | Average | Flexural strength | | | Increase of wt. | Reduction of |
| Sample No. | Kinds | wt. % | temp. °C. | Firing method | Method | Temp. °C. | $SiO_2$/$RE_2O_3$ | Thickness μm | Porosity % | grain diameter μm | Room temp. MPa | HT MPa | Toughness MPa·m$^{1/2}$ | due to oxidation mg/cm$^2$ | thickness μm |
|---|---|---|---|---|---|---|---|---|---|---|---|---|---|---|---|
| 46 | SiC | 1 | 1900 | GPS | coating | 1700 | 2.0 | 80 | 0 | 5 | 780 | 570 | 6.5 | 0.00 | 6 |
| 47 | SiC | 5 | 1900 | GPS | coating | 1700 | 2.0 | 80 | 0 | 5 | 850 | 610 | 7.0 | 0.03 | 3 |
| 48 | SiC | 10 | 1900 | GPS | coating | 1700 | 2.0 | 80 | 0 | 5 | 840 | 600 | 7.5 | 0.02 | 5 |
| 49 | SiC | 30 | 1900 | GPS | coating | 1700 | 2.0 | 80 | 0 | 5 | 810 | 590 | 8.0 | 0.02 | 2 |
| 50 | SiC | 50 | 1900 | GPS | coating | 1700 | 2.0 | 80 | 0 | 5 | 760 | 580 | 8.5 | 0.01 | 1 |
| 51 | $TaSi_2$ | 5 | 1900 | GPS | dip | 1700 | 2.0 | 80 | 0 | 5 | 790 | 580 | 7.3 | 0.03 | 5 |
| 52 | $NbSi_2$ | 5 | 1900 | GPS | dip | 1700 | 2.0 | 80 | 0 | 5 | 830 | 630 | 7.1 | 0.03 | 3 |
| 53 | $MoSi_2$ | 5 | 1900 | GPS | dip | 1700 | 2.0 | 80 | 0 | 5 | 840 | 630 | 7.0 | 0.02 | 5 |
| 54 | $WSi_2$ | 5 | 1900 | GPS | dip | 1700 | 2.0 | 80 | 0 | 5 | 800 | 590 | 7.3 | 0.01 | 4 |

The samples Nos. 46 to 50 to which SiC was added in an amount of from 1 to 50 parts by weight exhibited excellent mechanical properties such as strengths at room temperature of not smaller than 760 MPa, strengths at high temperatures (HT) of not smaller than 570 MPa, and toughnesses against the breakage of not smaller than 6.5 MPa·m$^{1/2}$, and did not easily peel off and developed little cracks.

Further, the samples Nos. 51 to 54 to which metal silicides were added exhibited excellent mechanical properties such as strengths at room temperature of not smaller than 790 MPa, strengths at high temperatures (HT) of not smaller than 580 MPa, and toughnesses against the breakage of not smaller than 7.0 MPa·m$^{1/2}$, and did not easily peel off and developed little cracks.

(Experiment 4)

A slurry was prepared in the same manner as in Experiment 1 by mixing 3 mol % of a Yb$_2$O$_3$ powder used in Experiment 1 or by mixing 3 mol % of an Lu$_2$O$_3$ powder used in Experiment 3 and 7.5 mol % of a silicon oxide powder into 89.5 mol % of the silicon nitride powder used in Experiment 1. The slurry was dried and molded. The molded article was then fired by GPS in nitrogen heated at 1900° C. to obtain a substrate.

Next, a mixture powder of an RE$_2$O$_3$ (RE is as shown in Table 4) powder and an SiO$_2$ powder was so prepared that the molar ratio of SiO$_2$/RE$_2$O$_3$ was 2, and a slurrty was prepared in the same manner as in Experiment 2 and was applied onto the sustrate followed by the heat treatment at 1700° C. to form a coating layer.

Further, a mixture powder of an RE$_2$O$_3$ (RE is as shown in Table 4) powder and an SiO$_2$ powder was so prepared that the molar ratio of SiO$_2$/RE$_2$O$_3$ was 2, and a protection layer was formed in the same manner as that of forming the coating layer. The heat treatment was conducted at a temperature of 1500° C. for one hour.

The obtained sintered bodies were evaluated in the same manner as in Example 1. The results were as shown in Table 4.

TABLE 4

| | | | | | | | Surface-coated sintered body | | | |
|---|---|---|---|---|---|---|---|---|---|---|
| | Coating layer | | | Protection layer | | | Flexural strength | | Toughness against | Increase in | Decrease |
| Sample No. | RE$_2$O$_3$ Kind | Thickness μm | Porosity % | RE$_2$O$_3$ Kind | Thickness μm | Porosity % | Room temp. MPa | HT MPa | the breakage MPa·m$^{1/2}$ | oxidizing amount mg/cm$^2$ | in thickness μm |
| 55 | Yb$_2$O$_3$ | 80 | 0 | Yb$_2$O$_3$ | 100 | 5 | 840 | 600 | 6.0 | 0.01 | 1 |
| 56 | Yb$_2$O$_3$ | 80 | 0 | Yb$_2$O$_3$ | 100 | 10 | 820 | 580 | 6.1 | 0.01 | 1 |
| 57 | Yb$_2$O$_3$ | 80 | 5 | Yb$_2$O$_3$ | 100 | 15 | 810 | 570 | 6.1 | 0.01 | 1 |
| 58 | Yb$_2$O$_3$ | 80 | 0 | Lu$_2$O$_3$ | 100 | 20 | 810 | 570 | 6.0 | 0.01 | 1 |
| 59 | Lu$_2$O$_3$ | 80 | 0 | Lu$_2$O$_3$ | 20 | 5 | 800 | 610 | 6.1 | 0.01 | 1 |
| 60 | Lu$_2$O$_3$ | 80 | 0 | Lu$_2$O$_3$ | 80 | 5 | 800 | 610 | 6.1 | 0.01 | 1 |

The samples Nos. 55 to 60 exhibited excellent mechanical properties such as strengths at room temperature of not smaller than 800 MPa, strengths (HT) at high temperatures of not smaller than 570 MPa, and toughnesses against the breakage of not smaller than 6.0 MPa·m$^{1/2}$, and peeled off little and developed cracks little.

What is claimed is:

1. A surface-coated sintered body of silicon nitride comprising:

a sintered substrate of silicon nitride; and a coating layer formed on the surfaces of said sintered substrate, wherein said coating layer comprises a crystalline phase of RE$_2$Si$_2$O$_7$ and/or RE$_2$SiO$_5$, where RE is a rare earth element, wherein said crystalline phase has an average crystalline grain diameter of not smaller than 0.1 μm, and the excess amount of SiO$_2$ contained in the coating layer is not larger than 10 mole %, and wherein a molar ratio of SiO$_2$/RE$_2$O$_3$ in the coating layer is from 0.9 to 2.3.

2. A surface-coated sintered body of silicon nitride according to claim 1, wherein said sintered substrate of silicon nitride has a crystalline phase on grain boundaries of silicon nitride grains.

3. A surface-coated sintered body of silicon nitride according to claim 2, wherein a crystalline phase of RE$_2$Si$_2$O$_7$ and/or RE$_2$SiO$_5$, where RE is a rare earth element, is on the grain boundaries of the silicon nitride grain in the sintered substrate of silicon nitride.

4. A surface-coated sintered body of silicon nitride according to claim 1, wherein said sintered substrate of silicon nitride contains the silicon nitride in an amount of from 70 to 99 mole %, the rare earth element in an amount of from 0.5 to 10 mole % calculated as an oxide thereof, and excess of oxygen at a molar ratio expressed by the following formula,

$$SiO_2/RE_2O_3$$

wherein SiO$_2$ is an amount in moles of excess oxygen calculated as SiO$_2$, and RE$_2$O$_3$ is an amount in moles of the rare earth element calculated as an oxide thereof, of not smaller than 2.

5. A surface-coated sintered body of silicon nitride according to claim 1, wherein the porosity of said coating layer is not larger than 10%.

6. A surface-coated sintered body of silicon nitride according to claim 4, wherein said sintered substrate of silicon nitride contains fine hard particles having an average particle diameter of greater than 1 μm and less than 5 μm in an amount of not larger than 50 parts by weight per 100 parts by weight of the sum of the silicon nitride, the rare earth element calculated as an oxide thereof and excess of oxygen calculated as silicon oxide.

7. A surface-coated sintered body of silicon nitride according to claim 6, wherein said fine hard particle are particles of at least one selected from the group consisting of a silicide of Ta, Nb, Mo or W and SiC.

8. A surface-coated sintered body of silicon nitride according to claim 1, wherein a protection layer of a crystalline phase of $RE_2Si_2O_7$ and/or $RE_2SiO_5$, where RE is a rare earth element, is further formed on said coating layer, said protection layer having a porosity of from 5 to 30%, which is larger than the porosity of said coating layer.

9. A surface-coated sintered body of silicon nitride according to claim 1, wherein the crystalline phase consists of $RE_2Si_2O_7$ (disilicate) and in the coating layer, the molar ratio of $SiO_2/RE_2O_3$ is from 1.9 to 2.3.

10. A surface-coated sintered body of silicon nitride according to claim 1, wherein the crystalline phase consists of $RE_2SiO_5$ (monosilicate) and in the coating layer, the molar ratio of $SiO_2/RE_2O_3$ is from 0.9 to 1.2.

* * * * *